(12) United States Patent
Bruno et al.

(10) Patent No.: US 7,753,046 B2
(45) Date of Patent: Jul. 13, 2010

(54) TANK RETAINER

(75) Inventors: Adrian A. Bruno, Rolling Meadows, IL (US); Leonard Zelek, Chicago, IL (US)

(73) Assignee: Weber-Stephen Products Co., Palatine, IL (US)

( * ) Notice: Subject to any disclaimer, the term of this patent is extended or adjusted under 35 U.S.C. 154(b) by 815 days.

(21) Appl. No.: 11/219,125

(22) Filed: Sep. 2, 2005

(65) Prior Publication Data
US 2007/0051357 A1 Mar. 8, 2007

(51) Int. Cl.
*F24B 3/00* (2006.01)
(52) U.S. Cl. ............... 126/25 R; 126/39 B; 126/39 R; 126/41 R; 248/129; 248/131; 248/146; 248/423
(58) Field of Classification Search ............... 126/41 R, 126/39 B, 40, 50, 25 R, 36, 39 R; 248/129, 248/131, 146, 423
See application file for complete search history.

(56) References Cited

U.S. PATENT DOCUMENTS

| | | | | | |
|---|---|---|---|---|---|
| 229,306 | A | * | 6/1880 | Cummins | 248/202.1 |
| 943,871 | A | * | 12/1909 | Gimbel | 248/202.1 |
| 2,702,641 | A | * | 2/1955 | Arthur | 211/85.18 |
| 2,870,983 | A | * | 1/1959 | Booth | 248/210 |
| 3,019,953 | A | * | 2/1962 | Umanoff | 224/411 |
| 3,123,850 | A | * | 3/1964 | Piken | 15/257.01 |
| 3,212,743 | A | * | 10/1965 | Culver | 248/313 |
| 3,278,148 | A | * | 10/1966 | Denaro | 248/210 |
| 3,603,548 | A | * | 9/1971 | Meyer, III | 248/211 |
| 3,638,802 | A | * | 2/1972 | Westerfield | 211/85.19 |
| 3,979,097 | A | * | 9/1976 | Balne | 248/211 |
| 4,071,976 | A | * | 2/1978 | Chernewski | 47/39 |
| 4,184,659 | A | * | 1/1980 | Abrahamson | 248/146 |
| 4,245,807 | A | * | 1/1981 | York | 248/310 |
| 4,805,935 | A | * | 2/1989 | Grayson | 280/33.992 |
| 5,158,067 | A | * | 10/1992 | Dutro et al. | 126/39 R |
| D331,792 | S | * | 12/1992 | Wilcox | D23/206 |

(Continued)

FOREIGN PATENT DOCUMENTS

AU 9066733 A * 5/1991

OTHER PUBLICATIONS

Coleman Event Grill 9995A Series, Jul. 15, 2004.*

*Primary Examiner*—Kenneth B Rinehart
*Assistant Examiner*—Jorge Pereiro
(74) *Attorney, Agent, or Firm*—Baker & McKenzie LLP; David I. Roche; Daniel A. Tallitsch

(57) ABSTRACT

The inventions disclosed herein relate to restraint devices for gas tanks. In a first embodiment, the tank retainer includes a bracket for engaging with the collar of a gas tank and a tray for engaging with the base of the gas tank. The bracket is preferably stationary wherein the tank, while supported by the tray, is rotated into engagement with a slot formed into the bracket. The tray preferably includes a channel for receiving and restraining the base of a gas tank. The brackets and trays can be used in combination or independently of one another. The bracket and tray are preferably distinct components of a gas grill; however, it is contemplated that the features of the bracket and tray can be incorporated into other components of a barbecue grill such as the frame members and lower shelf of the grill cart.

4 Claims, 3 Drawing Sheets

U.S. PATENT DOCUMENTS

| | | | | |
|---|---|---|---|---|
| 5,318,322 | A * | 6/1994 | Home | 280/645 |
| 5,458,309 | A * | 10/1995 | Craven et al. | 248/231.9 |
| 5,752,433 | A * | 5/1998 | Charlson et al. | 99/445 |
| 5,769,003 | A * | 6/1998 | Rose et al. | 108/55.3 |
| 5,931,149 | A * | 8/1999 | Lewis | 126/41 R |
| 5,941,229 | A * | 8/1999 | Schlosser et al. | 126/41 R |
| 6,135,104 | A * | 10/2000 | Lewis et al. | 126/41 R |
| 6,135,410 | A * | 10/2000 | Harrison | 248/346.01 |
| 6,148,668 | A | 11/2000 | Sieg | 73/296 |
| 6,267,261 | B1 * | 7/2001 | Lesage | 220/567.3 |
| D452,903 | S * | 1/2002 | Whitsitt | D23/322 |
| 6,439,517 | B1 * | 8/2002 | Applegate | 248/154 |
| 6,474,327 | B1 * | 11/2002 | Bossler | 126/41 R |
| 6,553,985 | B1 * | 4/2003 | Gafford | 126/41 R |
| 6,726,159 | B2 * | 4/2004 | Brake | 248/154 |
| 6,755,187 | B2 | 6/2004 | Harrod et al. | |
| 6,910,475 | B2 * | 6/2005 | Zelek et al. | 126/25 R |
| 2001/0015201 | A1 * | 8/2001 | Pollock et al. | 126/41 R |
| 2002/0140191 | A1 * | 10/2002 | Knowlton | 280/47.29 |
| 2002/0189604 | A1 * | 12/2002 | McKenzie | 126/30 |
| 2003/0025050 | A1 * | 2/2003 | Brake | 248/154 |
| 2004/0112361 | A1 * | 6/2004 | Zelek et al. | 126/25 R |

\* cited by examiner

TANK RETAINER

BACKGROUND OF THE INVENTIONS

The inventions described and claimed herein relate generally to securing fuel tanks. In particular, the inventions relate to securing gas tanks to a barbecue grill, although the inventions are not limited as such.

Most gas grills are comprised of a cooking chamber and a cart or frame assembly. The cooking chamber most often has a hinged lid and is mounted on top of or supported by the cart or frame assembly. Typical carts are constructed of a plurality of frame members such as molded plastic parts and/or metal tube members which are bolted, snapped, and/or welded together. Most gas grills have a plurality of shelves; typically, there is one shelf in the lower portion of the grill and at least one side shelf. Some gas grills incorporate auxiliary burners on the side shelves to provide an additional cooking location.

There are essentially two options for providing fuel to a gas grill. Assuming natural gas is available, the grill can be hard-piped to connect into the natural gas lines. Such an installation is sometimes preferable if portability is not a concern. However, many users either do not have natural gas or prefer flexibility in use of a grill. For instance, some users do not have space for a permanently installed grill. For those users, it would be preferable to have a self-contained unit that can be moved from one location, where the grill is stored, to another location, where the grill is actually used to cook food. Thus, gas grills are commonly designed for use with refillable tanks (also referred to as cylinders). The refillable tanks are generally placed in the lower portion of the cart on a shelf. The refillable tanks provide a fuel source, such as liquefied propane gas ("LPG"), such that the grill is self-contained and can be used away from a hard-piped source of gas.

Unfortunately, there are inherent dangers related to the use of such tanks. First and foremost, LPG is highly flammable. Secondarily, gas tanks can be heavy and unwieldy when full. Considering the flammability and weight of the gas tank, it is important to securely mount the tank to the grill to prevent the tank from falling off.

Although the claims are not limited as such, the preferred embodiment of present invention is adapted to secure gas tanks which are currently in common use. Those tanks are generally comprised of a body, a valve, a base, and a collar. The body of the tank is generally cylindrical or ellipsoid in shape and is designed to contain liquefied gas at high pressures. The valve is generally mounted at the top of the body to provide a convenient connection point for the gas grill. The base of the tank provides stability for the tank and allows the tank to stand upright. Generally, the base takes form as a cylindrical collar which is welded to the bottom of the body.

It is well known that the connection point of the valve to the body is generally a weak point of the tank. Considering the high pressure and flammable contents, damage to the valve could create missile or explosive hazards. Consequently, the collar is provided to protect the valve from damage. The collar is most often constructed of sheet metal which is formed into a partial circle and is welded to the top of the body. The sheet metal used to form the collar usually includes several stamped or cutout portions, at least one of which serves as a handle for transporting and positioning the gas tank.

There are several existing options for mounting and securing a gas tank to a gas grill; however, all of the existing options have drawbacks. For example, many gas grills use a hook member which engages with one of the cut-outs on the collar of the gas tank. The hook member is generally positioned below the cooking chamber or side shelf. The hook member is often used in conjunction with a clamp element for securing the handle on the hook member. With such a configuration, the hook member supports the entire weight of the gas tank; i.e., the base of the gas tank is not resting on a surface—the grill is free hanging. Such an assembly is disclosed in U.S. Pat. No. 6,148,668. One drawback of this design is that it can be quite difficult for users to mount the tank on the hook member. Specifically, it has been found that it is somewhat difficult for the user to align the hook member with the cut-out while squatting or bending over and supporting the weight of the gas tank, given the inconvenient location of the hook member. It can be especially difficult if the gas tank only has one handle, as many do.

A second existing option for securing a gas tank involves the use of a strap. The strap is affixed to the frame assembly of the grill and is wrapped around the periphery of the body of the tank. See U.S. Pat. No. 4,949,701 for an example of a strap installation. Like the hook member option, the strap option also has some drawbacks. For example, straps do not sufficiently restrain the tank from moving along its vertical axis. In the event the grill is subject to a vertical force, such as when the user is moving the grill from one location to another, the tank could become free from the strap. Also, placement of the strap is very critical. If the strap is placed too low on the tank, below the center of gravity of the tank, or too high on the tank, above the center of gravity of the tank, the tank could twist loose from the strap in the event that the grill is subjected to an excessive lateral force.

A third existing option for securing a gas tank involves the use of a bracket having a spring clip which clips onto the collar of the tank. An example of such a clip is disclosed in U.S. Pat. No. 5,458,309, issued to Craven, Jr. et al. (herein referred to as "Craven"). To secure a tank with the Craven device, the bracket is rotated upwards into an open position. Next, the tank is placed on the supporting strut. Finally, the bracket is rotated downwards into a closed position. See Craven, column 3, line 67 to column 4 line 12. The Craven device can be difficult to use because the spring clip must be manipulated with one hand to lock the tank in place. Consequently, only one hand is available to support the heavy tank during installation. Installation is complicated by the fact that the base of the tank is insufficiently supported; i.e., the tank must be balanced on a narrow strut while manipulating the bracket.

SUMMARY OF THE INVENTIONS

The problems of the prior art are solved by the present inventions. In a first embodiment of the present invention, a bracket is provided which has a slot for receiving the tank collar when the tank is rotated. Because the tank is manipulated, rather than the bracket, both of the users hands are available to support the tank. In a second embodiment of the present invention, a bracket is provided with an improved tank support which prevents the tank from tipping while the user engages the tank with the bracket. Because the tank is supported, the user need not manually support the tank while engaging the tank with the bracket. In a third embodiment of the present invention, an improved tank support is provided in combination with a bracket having slot for receiving the tank collar when the tank is rotated.

BRIEF DESCRIPTION OF THE DRAWINGS

These and other features, aspects, objects, and advantages of the inventions described and claimed herein will become better understood upon consideration of the following detailed description, appended claims, and accompanying drawings where:

Figure 1:
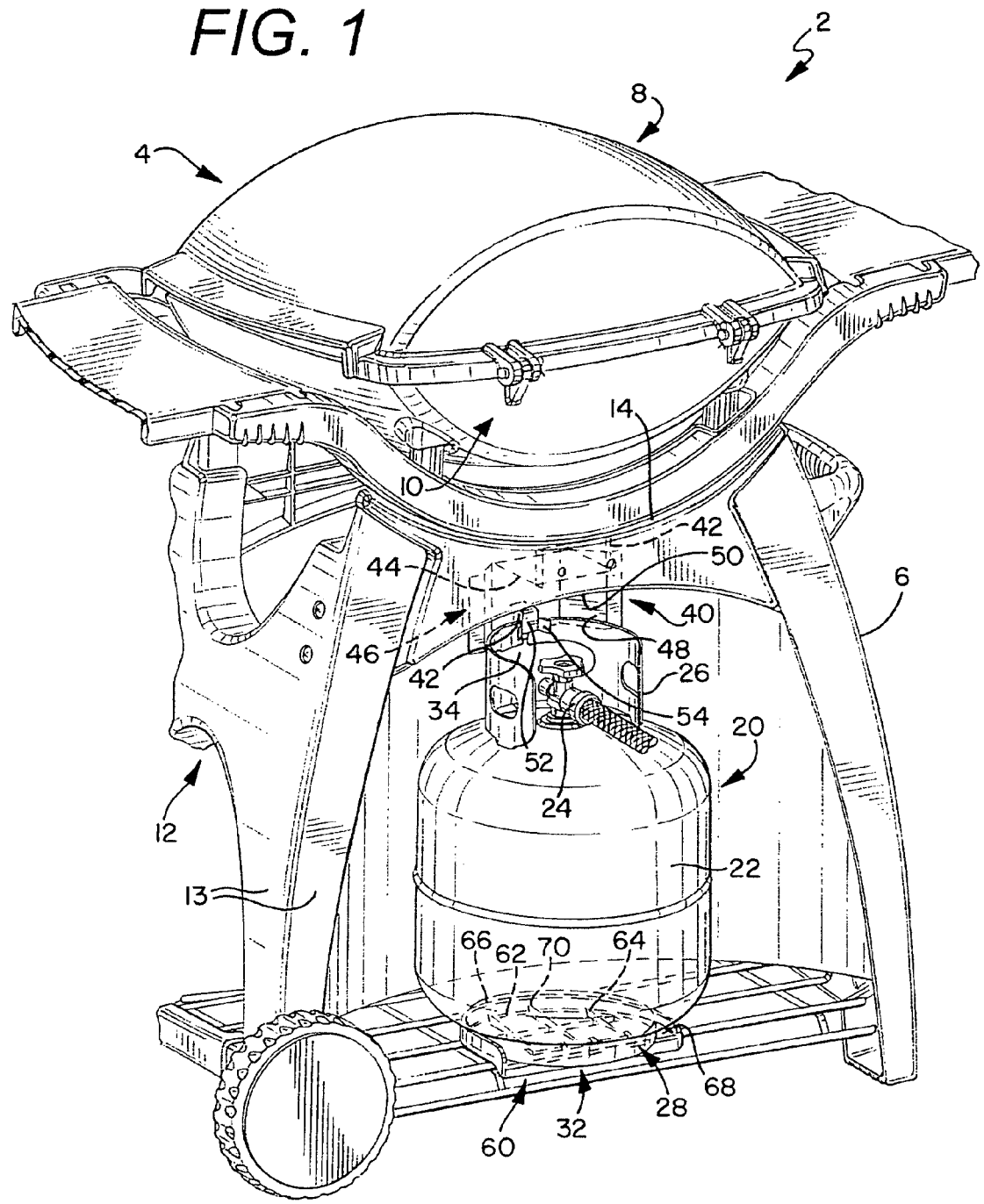
FIG. 1 is a perspective view of the preferred embodiments of the present inventions installed on a grill cart with a gas tank in the locked orientation.

It should be understood that the drawings are not necessarily to scale and that the embodiments are sometimes illustrated by graphic symbols, phantom lines, diagrammatic representations and fragmentary views. In certain instances, details which are not necessary for an understanding of the inventions described and claimed herein or which render other details difficult to perceive may have been omitted. It should be understood, of course, that the inventions described herein are not necessarily limited to the particular embodiments illustrated herein.

Like reference numerals will be used to refer to like or similar parts from Figure to Figure in the following description of the drawings.

DETAILED DESCRIPTION OF THE DRAWINGS

Referring first to FIG. 1, the preferred embodiments 40, 60 of the present inventions are shown retaining a gas tank 20 on the rearward side of a barbecue grill 2. The particular barbecue grill 2 pictured is for example purposes only and is not intended to limit the claims. Indeed, at least some of the embodiments of the present inventions described and claimed herein may be adapted to be mounted to any barbecue grill 2 or even any other device that uses gas tanks 20. The barbecue grill 2 depicted in FIG. 1 is comprised of a cooking chamber 4 and cart 6. The cooking chamber 4 is characterized by an upper member 8 which serves as a hinged lid and a lower member 10 which includes a cooking surface (not shown). The cart 6 supports the cooking chamber 4 at a convenient height for cooking and is comprised of frame members 12, 14, a lower shelf 16, wheels 18, a handle 19, and side shelves 15. Although not shown, many grill carts or frame assemblies include additional features such as auxiliary burners and casters. As depicted, the cart 6 is comprised of two essentially vertical members 12, each having two legs 13, which are present on the left and right side of the barbecue grill 2. The vertical members 12 are interconnected by two interconnecting members 14, one on the front side of the grill 2 and one on the back side of the grill 2. The cart 6 also has a lower shelf 14 which depends from the legs 13. The shelf 14 is depicted as a wire rack; however, the shelf 14 could be embodied in other forms such as sheet metal.

The preferred embodiments 40, 60 of the present inventions are intended to engage with and retain a common LPG tank 20, although it is contemplated that the claims cover embodiments of the present inventions that engage with other types of gas tanks 20. The gas tank 20 depicted in FIG. 1 comprises a body 22, a valve 24, a collar 26, and a base 28. The body 22 is a pressure vessel for storing the liquefied gas at high pressure and is, thus, generally cylindrical or ellipsoid in shape. Most consumers use 5 gallon gas tanks 20 with barbecue grills 2, which can weigh around 20 pounds when full. The gas tank 20 is supported by the base 28, which is most often comprised of sheet metal formed into a cylinder and welded to the bottom of the body 22. The base 28 can also be described as an abbreviated tube, wherein the formed sheet metal creates a wall defining an interior space 30 of the base 28. The base 28 is also characterized by a lower edge 32 which serves as a flat surface for supporting the body 22 in an upright position. The valve 24 is typically mounted to the top of the body 22, a convenient location for use with a barbecue grill 2. As discussed above, the valve 24 is a weak point of the tank 20. Consequently, gas tanks 20 are provided with a collar 26 to protect the valve 24 from damage. Like the base 28, the collar 26 is often formed from sheet metal, is cylindrically shaped, and is welded to the body 20; however, to facilitate use of the valve 24, the sheet metal is formed into a semicircle so that the valve port is accessible. The collar 26 includes several cutouts, at least one of which serves as a handle 34.

The preferred embodiments 40, 60 of the present inventions are characterized by a bracket 40 and a tray 60. The bracket 40 engages with the collar 26 of the gas tank 20, while the tray 60 engages with the base 28 of the gas tank 20. The bracket 40 and the tray 60, when used in combination, provide the most restraint for the gas tank 20. However, it is contemplated that the bracket 40 and the tray 60 can be used individually or in combination with a retaining device of the prior art. For example, the bracket 40 can be used with the strut disclosed in Craven. Alternatively, the bracket 40 can be used with a strap of the prior art. Additionally, the tray 60 can be used with the spring clip of Craven or with a strap of the prior art. Other combinations of the present inventions 40, 60 with restraining devices of the prior art may also provide satisfactory restraint and are contemplated as covered by the claims.

Figure 2:
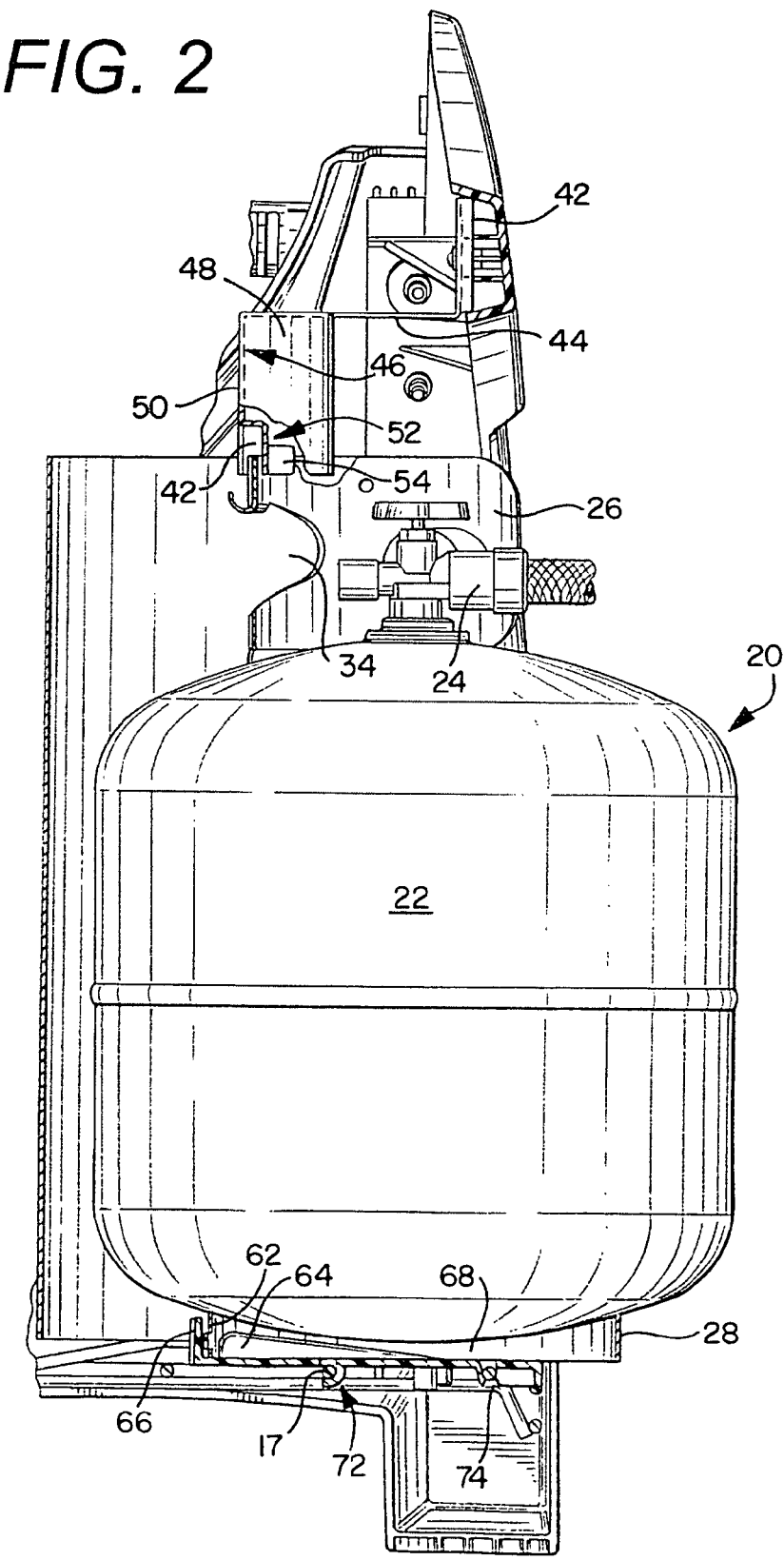
FIG. 2 is a side sectional view of the preferred embodiments of the present inventions with a gas tank in a locked orientation.

The bracket 40 is generally intended to restrain the gas tank 20 by engaging with the collar 26 of the gas tank 20. The bracket 40 is preferably formed from sheet metal and is comprised of a vertical segment 46 which depends from a horizontal segment 44, which in turn depends from a mounting segment 42. As best shown in FIG. 2, the mounting segment 42 is intended to be fastened to inside surface of the rear interconnecting member 14 through any satisfactory means such as screws, bolts, welding, etc. With such a configuration, the gas tank 20 is displaced on the rearward side of the barbecue grill 2. Depending upon the design of the barbecue grill, it may be desirable to locate the gas tank 20 in a different location. If so desired, the mounting segment 42 can be fastened to any other frame member 12, 14, the cooking chamber 4, any side shelves that may be present, or any other appropriate component of the barbecue grill 2. The horizontal segment 44 serves to laterally displace the vertical segment 46 in a location appropriate for engaging with the collar 26 of the gas tank. As shown in FIG. 2, the gas tank 20 slightly overhangs the back edge of the barbecue grill 2. If so desired, the horizontal segment 44 can be lengthened to displace the gas tank 20 farther inside of the barbecue grill 2. Alternatively, the horizontal segment 44 can be shortened to increase the overhang.

Referring now to both FIGS. 1 and 2, the vertical segment 46 is characterized by a slot (or channel or pathway) 42 for receiving and retaining the collar 26 of the gas tank 20. The vertical segment 46 is comprised of a rear surface 50 and preferably two vertical guides 48 for aligning the collar 26 of the gas tank 20 with the center of the rear surface 50. The back plate 50 preferably comprises a tab 52 which is forwardly displaced. The space between the rear surface 50 and the tab 52 defines the slot 42 for receiving the collar 26. Although shown having a rear surface 50 and a tab 52, the slot or pathway 42 could simply be defined by any suitable front restrain and rear restraint for restraining lateral movement of the tank 20. FIG. 2 depicts best how the collar 26 of the tank 20 is displaced in the slot 42 when the tank 20 is locked in place on the barbecue grill. To facilitate engagement between the collar 26 and the slot 42, the tab 52 may comprise vertical guides 54, which in combination with the vertical guides 48 direct the collar 26 into the slot 42. The tab 52 and the back plate 50 prevent both lateral movement and longitudinal movement (in the upward direction) of the tank 20 in the event that the grill cart 2 is subjected to an excessive force.

The tray 60 is generally intended to restrain the gas tank 20 by engaging with the base 28 of the tank 20. The tray 60 is preferably formed from molded plastic and is comprised of a horizontal support surface 68, a vertical peripheral wall 66, and a series of vertical strips or ribs 64. The ribs 64 give the tray additional rigidity; however, the tray 60 could be adequately formed without the ribs 64. For example, the tray 60 could be formed without the ribs 64 and instead with a vertical wall 66 that engages with the base 28 of the tank on either the inside or the outside surface of the base 28. Alternatively, the tray 60 could be embodied without the wall 66 and instead with ribs 64 which engage with the inside surface of the base and additional ribs which engage with the outside of the base 28. Even further, the tray 60 could be embodied without the vertical wall 66 and without the ribs 66, and instead could be embodied with ribs that engage with the outside surface of the base 28.

In the preferred embodiment of the tray 60, the horizontal support surface 68 is generally semi-circular in shape and is preferably the surface which supports the tank 20 at the tank's base 28; i.e. the lower edge 32 of the base 28 rests on the horizontal support surface 68. Both the vertical peripheral wall 66 and the vertical strips 64 extend upwardly from the horizontal support surface 68. The space between the vertical peripheral wall 66 and the far edges 70 of the vertical strips 64 define an arcuate channel 62 which receives the base 28 of the tank 20. As such, the vertical strips 64 extend into the interior space 30 of the base 28 when the tank 20 is placed on top of the tray 60. The vertical strips 64 and the vertical peripheral wall 66 form boundaries for the inside surface and outside surface of the base 28, respectively, for preventing lateral movement of the tank 20 in the event that the grill cart 2 is subjected to an excessive force. Likewise, the horizontal support surface 18 prevents vertical movement in the downward direction in the event that the grill cart 2 is subjected to an excessive force.

The tray 60 is preferably adapted to be mounted to the lower shelf 16 of a barbecue grill 2, as depicted in the Figures. However, a person of skill in the art would readily know how to adapt the tray 60 to be mounted to any other part of the grill. As shown in the Figures, the tray 60 is removably mounted to the lower shelf 16, although it is contemplated that the tray 60 can be permanently mounted to the lower shelf 16 as well. Further, the tray 60 is shown mounted to a wire shelf, but it is contemplated that a person of ordinary skill in the art would readily know how to adapt the tray 60 to be mounted to any other type of shelf, such as one made from sheet metal. As best depicted in FIG. 2, the tray 60 preferably comprises two flange members 72, 74. To mount the tray 60 to the lower shelf 16, the tray 60 is angled in such that the first flange member 72 engages a wire 17. At this point, the tray 60 is urged downward such that the second flange member 74 engages with another wire 17 to effectively lock the tray 60 in place.

Figure 3:
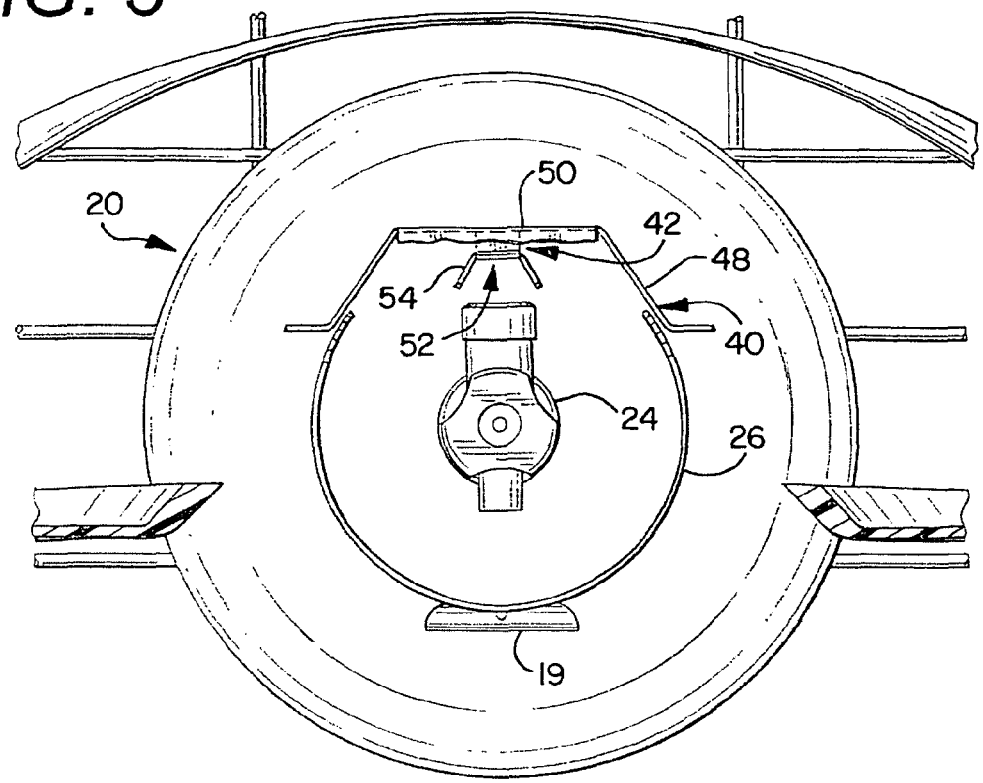
FIG. 3 is a top sectional view of the preferred embodiments of the present inventions with a gas tank in the unlocked orientation; and, FIG. 4 is a top sectional view of the preferred embodiments of the present inventions with a gas tank in an unlocked orientation.
Figure 4:
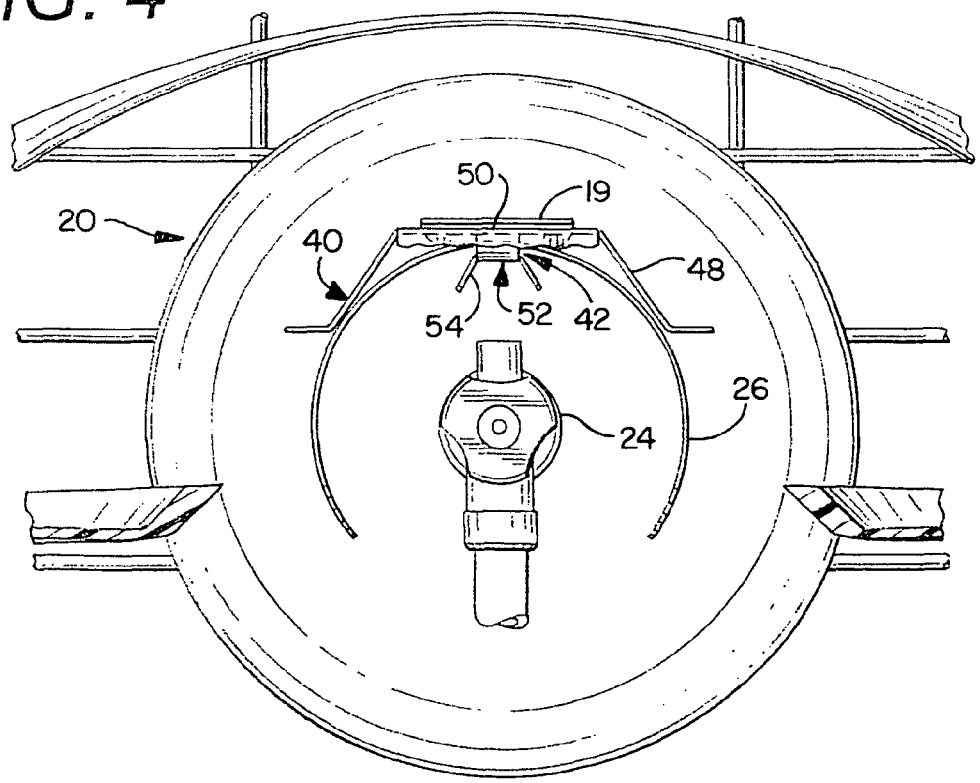

FIGS. 3 and 4 depict the method for engaging the tank 20 with the bracket 40. The user places the tank 20 onto the tray 60 or any other suitable support surface with the open portion of the collar 26 facing the bracket 40. Because the closed portion of the collar 26 is facing the user, depending upon the design of the grill, it would be impossible or difficult for the user to connect the hose to the tank 20. Consequently, the user must proceed to lock the tank 20 into the bracket 40 before attaching the hose to the tank 20. While only one handle 19 is depicted on the tank, the user is free to use both hands to manipulate the tank onto the tray 60. As mentioned above, some tanks 20 have two handles 19 to facilitate easier manipulation. When only one handle 19 is available, the user can grip the tank 20 with the free hand by the base 28, the body 22, the collar 26, or any other suitable location. At this point, assuming the bracket 40 is used with the preferred tray 60 of the present inventions, the user does not need to support the tank to prevent it from falling; i.e. the base 28 of the tank 20 is sufficiently supported to prevent tipping. To lock the tank 20 into place, the user rotates the tank 20 about its vertical axis such that the collar 26 is displaced within the slot 42, as depicted in FIG. 4. To fully secure the tank 20, the user then connects an appropriate length of gas supply hose (not shown) to the valve port 24, which prevents the tank 20 from rotating loose from the bracket 40. At this point, the tank 20 is restrained at both the collar 26 and the base 28, effectively restraining the tank from breaking loose in the event that the grill 2 is subjected to an excessive force. Optionally, the bracket 40 could be provided with a detent which is adapted to engage with one of the cutouts on the collar 26 for locking the tank 20 into position.

The preferred embodiments 40, 60 of the present invention take form as independent elements that mount to the cart 6 of a barbecue grill 6. It is contemplated that the bracket 40 and tray 60 can be universally dimensioned such that it can be provided with new grills or can be sold as an accessory for old grills. However, the features of the bracket 40 and tray 60, namely the slot 42 and the channel 62 can be formed integral with existing frame members or shelves of the grill cart or frame assembly and/or the cooking chamber 4. For example, the slot 42 can be molded or formed into the interconnecting members 14 and the channel can be molded or formed into the lower shelf 16. Alternatively, the slot can be molded for formed into the legs 13 or side shelves.

Although the inventions described and claimed herein have been described in considerable detail with reference to certain preferred embodiments, one skilled in the art will appreciate that the inventions described and claimed herein can be practiced by other than the preferred embodiments, which have been presented for purposes of illustration and not of limitation. Therefore, the spirit and scope of the appended claims should not be limited to the description of the preferred embodiments contained herein.

We claim:

1. A tank retainer on a frame assembly for a barbecue grill, the tank retainer adapted to retain a tank having a generally circular base flange at the bottom of the tank and a partial guard collar at the top of the tank, the tank retainer comprising:

a fixed pathway configured to receive the partial guard collar;

a first structure adapted to engage an outside surface of the generally circular base flange;

a second structure adapted to engage an inside surface of the generally circular base flange;

a bracket, wherein the bracket comprises a first barrier for engaging with an outside surface of partial guard collar and a second barrier for engaging with an inside surface of the partial guard collar, the first barrier and the second barrier being laterally spaced from each other to define the pathway; and, wherein the first barrier comprises a back wall and two diverging wings extending from opposite ends of the back wall, the diverging wings being adapted to guide the partial guard collar into the pathway and allow the partial guard collar to enter the pathway from either side.

2. The tank retainer of claim 1, wherein the second barrier comprises a generally vertical oriented tab that is bounded on either side by corresponding diverging wings that are generally parallel to the diverging wings of the first barrier, the corresponding diverging wings also being adapted to guide the partial guard collar into the pathway and allow the partial guard collar to enter the pathway from either side.

3. The tank retainer of claim 2, wherein the bracket further includes a mounting segment and horizontal segment, the mounting segment being adapted for connection to a frame member of the barbecue grill, the horizontal segment depending from the mounting segment, the back wall depending from the horizontal segment, the horizontal segment laterally displacing the back wall from the mounting segment, whereby the tank slightly extends beyond an edge of the barbecue grill to facilitate easy access to the tank.

4. A tank retainer on a frame assembly for a barbecue grill, the tank retainer adapted to retain a tank having a generally circular base flange at the bottom of the tank and a partial guard collar at the top of the tank, the tank retainer comprising:
- a fixed pathway configured to receive the partial guard collar;
- a first structure adapted to engage an outside surface of the generally circular base flange;
- a second structure adapted to engage an inside surface of the generally circular base flange;
- a molded plastic tray and a bracket, the molded plastic tray including the first and second structures and being adapted to snap onto a wire rack of the barbecue grill, and the bracket including the pathway and being adapted to be connected to a frame of the barbecue grill; and,
- wherein the barbecue grill includes a fuel supply hose that is of a length that allows a connection to be made between the tank and hose, when the tank is supported in the molded plastic tray, only when the partial guard collar of the tank is received within the pathway of the tank retainer.

* * * * *